United States Patent [19]

Brearley et al.

[11] Patent Number: 4,712,839
[45] Date of Patent: Dec. 15, 1987

[54] VEHICLE BRAKING SYSTEM

[75] Inventors: Malcolm Brearley, Solihull; Richard B. Moseley, Birmingham, both of England

[73] Assignee: Lucas Industries public limited company, Birmingham, England

[21] Appl. No.: 868,559

[22] Filed: May 30, 1986

[30] Foreign Application Priority Data

May 30, 1985 [GB] United Kingdom ............... 8513686

[51] Int. Cl.$^4$ .................... B60T 13/66; B60T 13/74
[52] U.S. Cl. ........................... 303/3; 188/195; 188/158; 303/15; 303/20; 303/100; 303/107; 303/22 R
[58] Field of Search .......................... 303/2–3, 303/20, 93, 94–110, 118, 15, 22 R, 22 A, 61, DIGS. 3–4; 188/195, 181 R, 156–157, 158–165; 364/424, 426

[56] References Cited

U.S. PATENT DOCUMENTS

| | | | |
|---|---|---|---|
| 4,425,006 | 1/1984 | Bertrand et al. | 303/3 |
| 4,610,484 | 9/1986 | Amberg et al. | 303/93 X |
| 4,624,506 | 11/1986 | Doto | 303/15 X |
| 4,631,514 | 12/1986 | Fujiwara | 303/15 X |
| 4,632,466 | 12/1986 | Grauel et al. | 303/22 R X |
| 4,657,310 | 4/1987 | Klein | 303/22 R X |
| 4,659,149 | 4/1987 | Rumsey et al. | 303/3 |
| 4,671,577 | 6/1987 | Woods | 188/156 X |

Primary Examiner—Douglas C. Butler
Attorney, Agent, or Firm—Scrivener and Clarke

[57] ABSTRACT

An electronically controlled braking system for a vehicle in which vehicle load measurements, made dynamically, as used to modify the braking demand, individually for each axle of the vehicle and in which, under predetermined conditions of vehicle speed, braking level and operating gradient, the deceleration error formed between braking demand by the driver and measured actual vehicle deceleration is used gradually, over a number of vehicle stops, to form an adaptive factor for correcting the braking demand in order to restore expected braking performance. No correction to the adaptive factor based on the deceleration error is made during a given stopping operation of the vehicle, but a summation of previous errors is arranged to cause a small increment in correction to be made after each stop until, over a number of vehicle stops, the error formed under the predetermined conditions falls to zero. Braking demands by the driver can be arranged to be compensated by introducing a demand offset dependent on the prevailing gradient on which the vehicle is operating.

11 Claims, 5 Drawing Figures

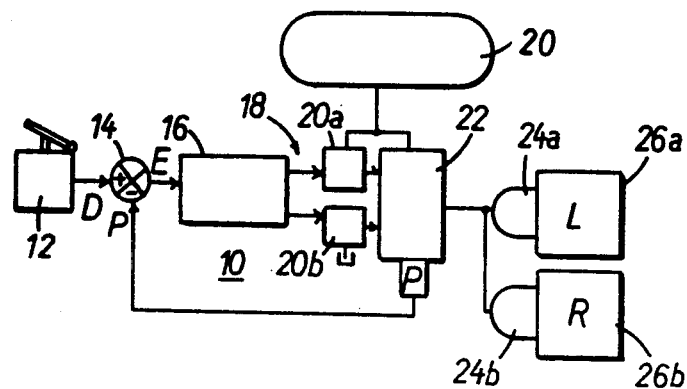
Fig_1. (PRIOR ART)
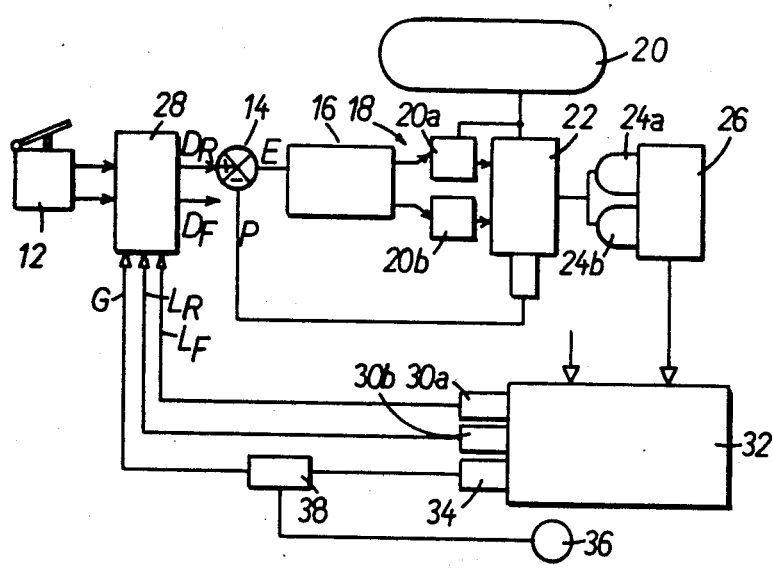
Fig_2.

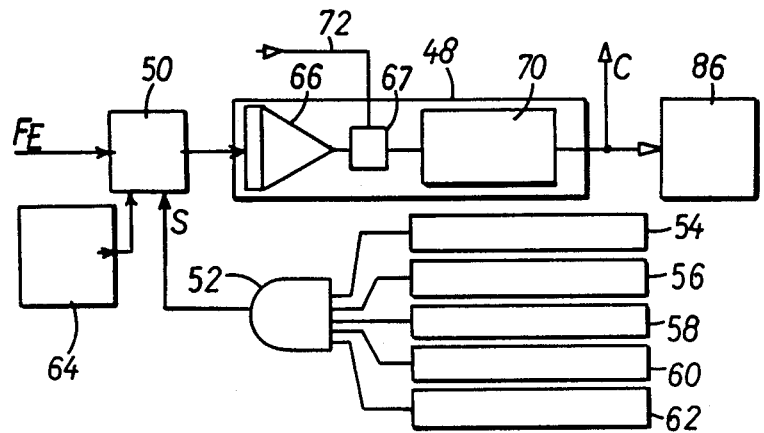
_Fig 4._
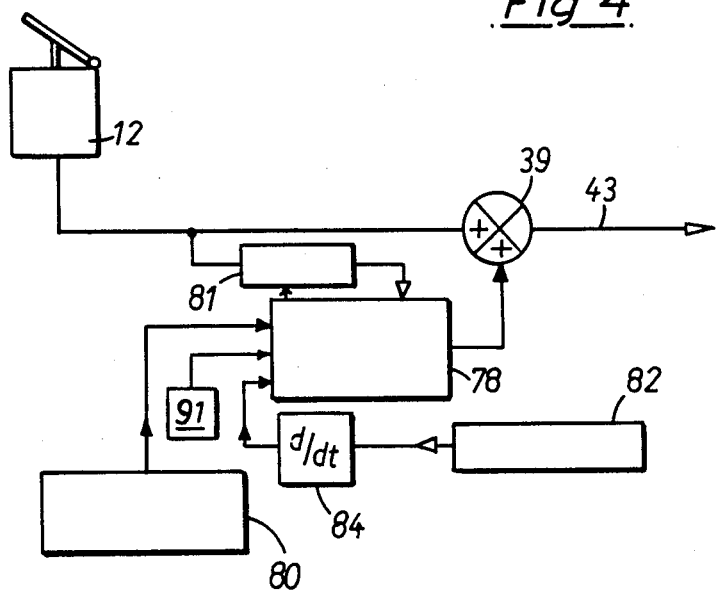
_Fig 5._

VEHICLE BRAKING SYSTEM

The present invention relates to electrically controlled braking systems for vehicles.

An electrically controlled braking system is known which includes an input transducer producing the driver's braking demands in electrical terms, a suitable electronic pressure controller, and electrical relay valves with integral pressure transducers on each axle of the vehicle. The system includes a pressure control loop taking an input signal from the brake pedal transducer which is used to provide a pressure error signal by comparison with a pressure transducer output signal, this pressure error forming the input to a pressure controller which generates an output signal which causes the pressure developed by an electro-pneumatic or electro-hydraulic converter to change in a direction such as to reduce the pressure error amplitude.

It is an object of the present invention to provide an electrically controlled braking system of this type having improved braking control characteristics in relation to known systems.

In accordance with the present invention, there is provided an electronically controlled braking system in which vehicle load measurements, made dynamically, are used to modify the braking demand, individually for each axle and in which, under preset conditions of speed, braking level and operating gradient, the error formed between braking demand and measured vehicle deceleration is used gradually, over a number of stops, to adapt braking pressures to restore expected braking performance.

Preferably, no correction based on deceleration error is made during a vehicle stop but a summation of previous errors is arranged to cause a small increment in brake pressure correction to be applied after each stop until said error formed under the preset conditions falls to zero.

Advantageously, braking pressure constants are compensated by introducing a demand offset in response to vehicle gradient, said operating gradient being measured as an equivalent deceleration, by comparison of an on-board deceleration transducer and the corresponding figure generated by measuring the rate of change of wheel speeds.

In the latter system, the gradient correction can be made at low speeds but based on data which was obtained at speeds above a preset low limit and which is inhibited at very low braking demands. The gradient correction can provide a demand offset but is never allowed to exceed the actual driver demand in amplitude and at very low demands is reduced to zero.

Preferably, the adaptive constant slowly built up over a series of vehicle stops is used to form a vehicle brake performance figure to be output by the system via a diagnostic port on demand. The adaptive constant can be monitored against a preset level, brake deficiency being signalled if this level is exceeded.

The invention is described further hereinafter, by way of example only, with reference to the accompanying drawings, in which:

FIG. 1 is a diagrammatic illustration of a known electrically controlled braking system for vehicles;

FIG. 2 is a generalised illustration of one embodiment of a braking system in accordance with the present invention;

FIG. 4 illustrates diagrammatically one means for achieving the long term adaptive constant in the system of FIG. 3; and FIG. 5 illustrates one means of achieving a gradient corrected demand signal of the embodiment of FIGS. 2 through 4.

Figure 3:
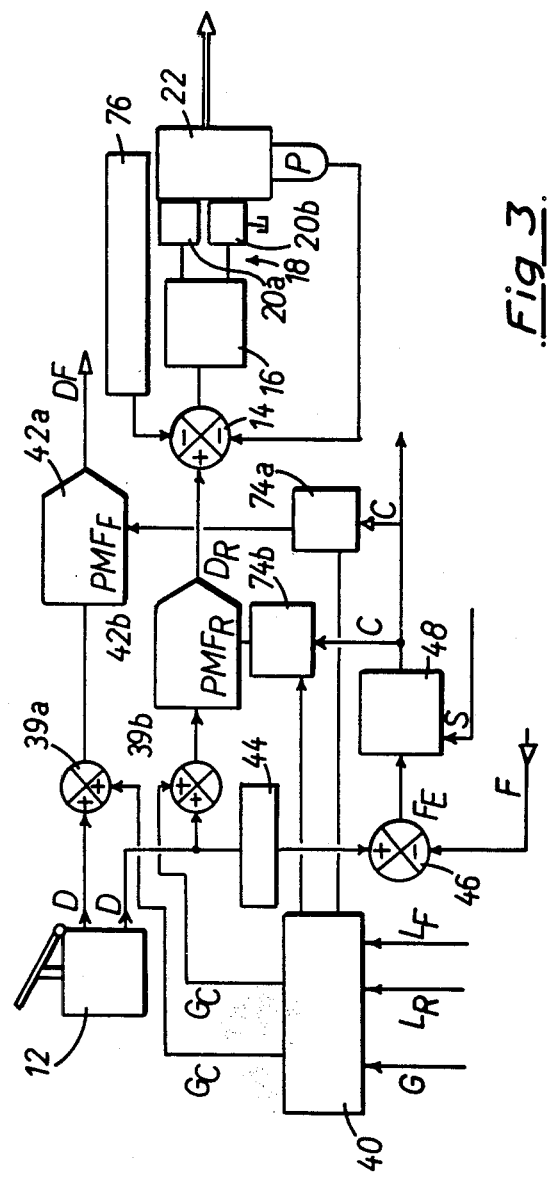
FIG. 3 is a more detailed illustration of the embodiment of FIG. 2.

In a compensated braking system a foot pedal transducer generates a first signal indicating the braking level desired by the driver and additional sensors measure the vehicle axle loads and the operating gradient. The system makes appropriate open loop corrections to the brake pressure demands being interpreted from the driver pedal input with the aim of restoring the vehicle deceleration to be fixed in proportion to the driver's demand.

Referring now to FIG. 1, there is shown a known system which employs a pressure control loop 10 taking an input D from a brake pedal transducer 12 which is used to provide a pressure error signal E by comparison in an adder/subtractor 14 with a pressure transducer output signal P, this pressure error E forming the input to a pressure controller 16 which generates an output signal which causes the pressure developed by an electro-pneumatic or electro-hydraulic converter 18 to change in a direction such as to reduce the amplitude of the pressure error E. Pneumatic or hydraulic pressure medium is stored in a reservoir 20.

The nature and circuit of such a pressure controller 16 depends upon the type of converter 18 employed. Two such converter principles are well known, namely an analogue system in which a valve is employed with pressure output developed proportional to solenoid current and a digital system, as shown in FIG. 1, in which a pair of simpler solenoid valves 20a, 20b is employed to raise or lower a control chamber pressure by selective energisation. One form of pneumatic converter employs a relay valve 22 which responds to this control chamber pressure and which re-balances into the closed condition when the brake pressures at the actuators 24a, 24b for the brakes 26a, 26b (left and right) of the vehicle become equal to this control pressure. Such a valve 22 has an advantage in that the control chamber pressure responds rapidly to valve opening giving a fast control loop which is accurate and responsive.

FIG. 2 illustrates a compensated braking system in accordance with the present invention which comprises closed loop controllers of the type shown in FIG. 1 which are separate for each axle or for each wheel and which are supplied with pressure demands D by a braking correction sub-system 28 such that front and rear systems may receive different pressure demands $D_F$, $D_R$ for equal braking inputs.

In the present system, as an alternative strategy to closing the deceleration loop for the vehicle, the main sources of braking parameter change are measured and the pressure demands to the inner closed loop pressure systems are adjusted to compensate for these measured changes. This leaves the remaining principal sources of system drift within the brakes themselves so that errors measured are an indication of brake condition and can be used to slowly adapt the relationship between brake demand and brake application pressures. As explained in detail below, this adaptation is arranged to take place over a sequence of many stops that the vehicle makes, but with no adaptive changes taking place during the course of each stop.

The main sources of braking system disturbance are vehicle load and operating gradient, both of which can change suddenly, and brake deterioration which is much more gradual. The sudden changes require compensation by corresponding sudden corrections whilst slow changes can be countered by a gradual adaptation over a time period which can extend into days or weeks depending on vehicle usage.

As indicated in FIG. 2, axle load readings $L_F$, $L_R$, generated by additional transducers 30a, 30b (front and rear) on the vehicle 32, are used as correction inputs and for each axle form a pressure constant expressed in psi/ton/g. As explained in more detail below in connection with FIG. 3, this is achieved by the use of a digital multiplier which forms a suitably scaled product of pedal input demand D and axle load measurement L, to form the pressure demand figure $D_R$, $D_F$.

The other main disturbance to braking caused by gradient can be determined by a comparison between deceleration as sensed by a vehicle decelerometer 34 and figures generated from speeds sensed by speed sensors 36 at the vehicle wheels and differentiated electronically in a gradient determination means 38 after being combined to form a vehicle reference signal in a manner which is well known in anti-lock systems (see FIG. 5 and corresponding description). The gradient figure G generated is a decelerated error with a sign which indicates uphill or downhill and which can be added directly to braking demand D to achieve appropriate correction. As explained in detail hereinafter, at very low demand levels where check braking is being called, (for example where the vehicle is travelling downhill at a constant speed and braking demand is not intended to produce any appreciable deceleration), this addition is arranged to be inhibited and similar inhibition may be deliberately caused at low speed or may be based on gradient signals stored as the speed falls through a preset low speed band. Furthermore, at light braking demands, the gradient compensation offset is arranged to be reduced so that at no time is it allowed to exceed the actual driver demand, so as to prevent input cancellation or any step disturbance to braking as demand is gradually increased.

FIG. 3 shows more detail of an example of a compensated braking controller in accordance with this invention where compensating input signals are derived from load measurements on each axle and gradient signals are provided by a gradient detector as in FIG. 2. Only the rear pressure channel is illustrated fully in FIG. 3, the front pressure channel being essentially the same and therefore being largely omitted for simplification of the drawings.

Front and rear channel demand signals D from the brake demand transducer 12 are added in respective adders 39a, 39b to the gradient correction signals $G_C$ from a correction calculating means 40 and supplied as first inputs to respective front and rear digital multipliers 42a, 42b. Deceleration demand signals from the demand transducer 12 are also, after filtering in a filter 44, compared in an adder/subtractor 46 with deceleration feedback signals F from a vehicle decelerometer (not shown) to form a deceleration error signal $F_E$ which is supplied to a calculation means 48 for providing a long term adaptive constant C for the vehicle brakes. As illustrated in more detail in FIG. 4, a controllable switch 50 is adapted to permit the passage of the deceleration error $F_E$ to the long term adaptive constant calculating means 48 only when a control signal S from a gate 52 indicates the receipt of signals from a sensor 54 responsive to the demand being greater than a first predetermined level, a sensor 56 responsive to the gradient being in a zero band, a sensor 58 responsive to the speed being greater than a first predetermined threshold, a sensor 60 responsive to the demand being less than a second predetermined level and a sensor 62 responsive to the vehicle speed being less than a second predetermined threshold. In the absence of the signals, the switch inhibits the deceleration error from reaching the circuit 48. The switch 50 also inhibits the deceleration error on receipt of a signal from an anti-lock detection means 64.

The long term adaptive constant producing means 48 includes a very slow integrating means 66 whose output is connected via a switch 68 to a sample averaging means 70, the switch 67 being controlled in response to an End of STOP Pulse provided on a line 72 at the end of each vehicle stop. It should be pointed out, however, that the block diagrams showing the long term adaptive constant being derived from deceleration error are an attempt to illustrate in simple terms what in practice would be achieved with software.

By way of example, the integrator 66 of FIG. 4 can be simulated by a digital computer using an accumulating memory location which receives the addition of processed deceleration errors at regular preset intervals. The integrator can be reset at any point in time, to a preset starting point such as unity, or a scaled value representing unity. The integral correction developed at the end of any stop (or at the low speed point at which the correction changes are discontinued) can be determined by calculation of the difference between the integrator final reading and the stored integrator start figure.

Thus at the end of each stop, the integrating location can be reset to the stored integral start figure. This may be a preset base figure or may alternatively be a progressive figure formed from the previous integral start level plus a percentage of the integral correction developed during the stop. If this is the case, the stored integrator start figure is changed after each stop and control is thereby adapted to suit braking conditions. Example—Suppose the unity figure is 128. This is the base SISF. Integral correction=Integrator reading, In-Stored integrator start figure SISF. The routine is as shown below.

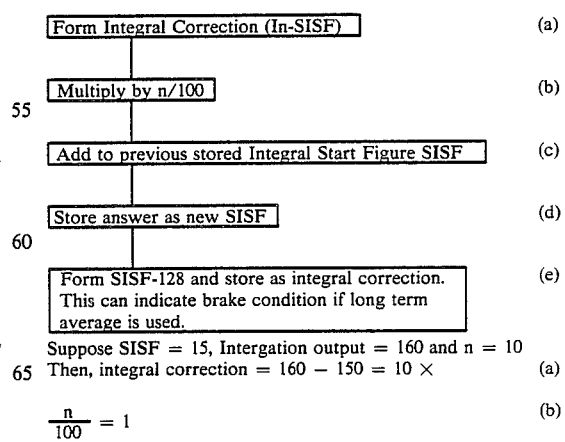

Suppose SISF = 15, Intergration output = 160 and n = 10
Then, integral correction = 160 − 150 = 10 ×  (a)

$\frac{n}{100} = 1$  (b)

```
                                            -continued
SISF = 150 + 1                                    (c) (d)
Therefore, integral correction level = 151 − 128 = 23  (e)
```

The resulting long term adaptive constant C, updated at the end of each stop, is applied to the second inputs of the multipliers 42a, 42b by way of respective load apportioning circuits 74a, 74b adapted to modify the long term adaptive constant C in dependence upon the prevailing vehicle load figures $L_R$, $L_F$, received from the load sensors 30a, 30b and supplied via the element 40.

As indicated in FIG. 5, the prevailing gradient on which the vehicle is operating is calculated in a circuit 78 from signals received from a vehicle decelerometer 80 and from signals from a wheel speed sensor 82, differentiated at 84. Circuit 78 also receives a limiting signal from a low-speed threshold device 91 whenever the correction has a tendency to exceed the driver's demand. Gradient corrected demand is obtained from the adder 39 on a line 43. The gradient is obtained by taking the difference between:

(a) Rate of change of wheel speed, and
(b) Vehicle decelerometer output.

This results because, on a gradient, the suspended mass of the decelerometer suffers a gravity induced offset (which is algebraically additive to any deceleration/acceleration which is taking place. This offset is best envisaged in the static condition, pointing downhill, where it represents the equivalent deceleration being applied to the vehicle to prevent a totally free body adopting an acceleration resulting from the gradient induced continuous speed increase. The difference between the two signals is therefore in acceleration terms and must be added to the demand (deceleration) signals being produced by the driver. On downhill slopes these signals are added to the driver demand to generate extra braking, and on uphill slopes are subtracted from the demand, as less braking is required. It should be noted that at no time is this gradient correction allowed to exceed the demand, this being the purpose of amplitude limiter 81 which receives a reference input from the driver demand and which reduces the correction to zero at very low demand levels. Thus, on flat ground the two measuring systems always generate equal signals, even under deceleration and acceleration conditions.

Thus, referring back to FIG. 3, input demands D produced by the brake pedal are added at the adder 39 to the two gradient correction signals $G_C$, which will be nominally equal but are separate in that they are supplied to the two (or more) axle control channels which are provided to maintain the accepted split-braking standards. There are certain circumstances in which equal correction front and rear is not warranted and the signal processing will be effected in the correction calculator which has access to the axle load signals. Gradient corrected demands are used to form the inputs to each axle multiplier 42 where the adaptive adjustment and load corrections are made by multiplying each input by a local Pressure Modification Factor (PMF), given by: PMF = Vehicle Adaptive Constant C × Axle Load Correction Factor. The resulting output, suitably scaled for compatibility with the pressure transducer output range, is used to form the axle pressure demands $D_F$ or $D_R$ to the pressure controllers. One remaining input to the pressure controller can be an anti-lock pressure override signal obtained from a separate skid detector 76, possibly incorporated within the same controller.

With compensation applied to the brake pressure demands and with no override conditions in force from wheel skidding signals, braking will be much more repeatable than with non-controlled vehicles. The driver demand will be related to achieved vehicle deceleration and comparison of these signals, demand and deceleration, can be expected to show good agreement unless braking constants change due to brake factor changes.

By means of the circuitry shown in FIG. 4, deceleration errors are used to modify the long term adaptive constant only when:

i. the vehicle is on level ground and
ii. the demand is in mid-range, (for example 0.2 to 0.5 g) and
iii. The speed is in mid-range (for example 20–80 kph) to indicate the condition of vehicle braking overall. An accumulation of similarly derived figures on each stop is formed and is processed in the very slow integrating means 66 to generate the adaptive constant C, assessed over a sizeable series of vehicle stops. This adaptive constant has a nominal or start value of unity and is gradually modified to correct changing brake conditions between stops. This constant is therefore a good indicative of brake condition and is regularly updated within the controller and stored in electrically alterable non-volatile computer memory to provide, at start up or on demand, a brake performance factor via a diagnostic output port 86. Internally this constant will be monitored and compared against a preset alarm level to signal when braking deterioration is such as to merit urgent service attention.

We claim:

1. An electronically controlled braking system for a vehicle comprising:
   (a) means for generating driver's braking demand signals for the vehicle brakes;
   (b) means for generating electrical signals dependent upon dynamic vehicle load;
   (c) means enabling the braking demand signals to be modified, individually for each axle of the vehicle, in dependence upon vehicle load measurements;
   (d) means for sensing predetermined conditions of vehicle speed, braking level and vehicle operating gradient;
   (e) means for generating a signal proportional to vehicle deceleration;
   (f) means for generating a deceleration error signal by comparison of the driver's braking demand signal and measured actual deceleration; and
   (g) means for generating an adaptive factor from said deceleration error signal and using same, under said predetermined conditions of vehicle speed, braking level and operating gradient, and over a number of vehicle stops, to correct the braking demand signals in order to compensate for long term deterioration of the brakes and to restore expected braking performance.

2. An electronically controlled braking system according to claim 1, including means for summing said deceleration errors over a plurality of stops, means for inhibiting correction to said adaptive factor during a given stopping operation of the vehicle, and means utilising the summation of previous errors to cause a small increment in correction after each stop until, over a number of vehicle stops, said error formed under said predetermined conditions falls to zero.

3. An electronically controlled braking system according to claim 2, including means for sensing the gradient on which the vehicle is operating, and means for compensating the driver's braking demand signals by introducing a demand offset dependent on the prevailing operating gradient.

4. An electronically controlled braking system according to claim 3, in which the gradient correction is made at low vehicle speeds but based on data which was obtained at speeds above a predetermined low limit but in which means are included for inhibiting correction at very low braking demands.

5. An electronically controlled braking system according to claim 4, in which the gradient correction is permitted to provide a demand offset, and including a means for inhibiting said correction from ever exceeding the actual driver demand in amplitude, and at very low demand for reducing same to zero.

6. An electronically controlled braking system according to claim 1, including means utilising the adaptive factor, slowly built up over a number of vehicle stops, to form a vehicle brake performance figure which is output by the system.

7. An electronically controlled braking system according to claim 1, including means for monitoring the adaptive factor against a predetermined level to provide a warning signal indicative of brake deficiency if this level is exceeded.

8. An electronically controlled braking system for a vehicle comprising a brake pedal transducer, a plurality of pressure control channels adapted to be controlled by a driver's demand signal from said brake pedal transducer, representing a braking requirement, first sensor means providing dynamic load signals representative of vehicle axle loads, second sensor means forming a signal representative of vehicle deceleration, third sensor means forming a signal G representative of the gradient on which the vehicle is operating, means forming an error signal representative of the difference between braking demand and measured vehicle deceleration, means for modifying the driver's braking demand signals in dependence upon the vehicle axle load measurements from said first sensor means and means for forming from said deceleration error, gradually over a number of vehicle stops and under certain conditions of vehicle speed, braking level and operating gradient, a long term adaptive factor for correcting the braking demand in order to restore expected braking performance.

9. An electronically controlled braking system according to claim 8, further including a means in which said braking demand signals are further modified by the introduction of a demand offset dependent on said signal G representative of operating gradient.

10. An electronically controlled braking system according to claim 9, wherein said third sensor means measures said operating gradient as an equivalent deceleration by effecting a comparison of the signal from said second sensor means and a corresponding figure generated by measuring the rate of change of vehicle wheel speed.

11. The method of forming an adaptive factor for correcting braking demand in an electronically controlled braking system comprising performing dynamic measurements of vehicle load, using said load measurements to modify braking demand individually for each axle of the vehicle, and using gradually over a number of stops the deceleration error formed between braking demand by the driver and measured actual vehicle deceleration to form said adaptive factor for correcting the braking demand and thereby restore expected braking performance.

* * * * *